United States Patent [19]
Lehr

[11] Patent Number: 4,847,331
[45] Date of Patent: * Jul. 11, 1989

[54] METHOD AND COMPOSITION FOR IMPROVED MELT PROCESSABILITY OF CHLORINATED POLYVINYL CHLORIDE

[75] Inventor: Marvin H. Lehr, Akron, Ohio

[73] Assignee: The B. F. Goodrich Company, Akron, Ohio

[*] Notice: The portion of the term of this patent subsequent to Apr. 22, 2003 has been disclaimed.

[21] Appl. No.: 821,301

[22] Filed: Jan. 22, 1986

[51] Int. Cl.$^4$ ............................................. C08L 33/06
[52] U.S. Cl. .................... 525/227; 525/239
[58] Field of Search ......................................... 525/227

[56] References Cited

U.S. PATENT DOCUMENTS 4,584,349  4/1986  Lehr .................................... 525/227

OTHER PUBLICATIONS

J. R. Fried, et al, "Modeling of Tensile Properties of Polymer Blends: PPO/Poly(Styrene-co-p-chlorostyrene)", 50 *J. Appl. Phys.* p. 6052 (1979).
P. R. Couchman "Compositional Variation of Glass-- Transition Temperatures", 11 *Macromolecules*, p. 1156 (1978).
L. P. McMaster, "Aspects of Polymer-Polymer Thermodynamics", 6 *Macromolecules*, p. 760 (1973).
L. M. Robeson, "Applications of Polymer Blends: Emphasis on Recent Advances," 24 *Polymer Eng. & Science*, p. 587.
E. A. Joseph, et al, "Mechanical Properties of Miscible Polycarbonate-Copolyester Blends," 23 *Polymer*, p. 112 (1982).

*Primary Examiner*—Jacob Ziegler
*Attorney, Agent, or Firm*—Woodrow W. Ban

[57] ABSTRACT

A composition of matter comprising a blend of CPVC having a chlorine content of between about 60% and 66% by weight and a polymethylmethacrylate content of between about 0% and 80% by weight of the blend. The composition of matter displays substantially single, homogeneous phase behavior with the CPVC and polymethylmethacrylate being substantially or completely miscible. Blending of CPVC and polymethylmethacrylate provides a reulting blended polymeric material having enhanced temperature and durability properties. Melt processability of CPVC polymeric material may be enhanced by the inclusion of polymethylmethacrylate to form the blends.

4 Claims, 3 Drawing Sheets

METHOD AND COMPOSITION FOR IMPROVED MELT PROCESSABILITY OF CHLORINATED POLYVINYL CHLORIDE

FIELD OF THE INVENTION

This invention relates to chlorinated polyvinyl chloride and to methods for enhancing the melt processability of chlorinated polyvinyl chloride. More particularly, this invention relates to blends of chlorinated polyvinyl chloride with other polymeric materials providing enhanced melt processability. Specifically, this invention pertains to miscible blends of chlorinated polyvinyl chloride with other polymeric materials providing enhanced melt processability.

BACKGROUND OF THE INVENTION

While polymer blends have been reported in the literature from time to time, only within the past generation have polymer blends become sufficiently numerous and the advantages of polymer blends sufficiently apparent to warrant widespread investigation. While originally considered rare, miscible polymer blends more recently have been noted with increasing frequency. Miscible blends of a second polymer and a first polymer have found utility in providing enhanced properties such as plasticization, tensile strength, melt processability, and increased resistance to heat distortion. Particularly in applications where polymeric materials are to be subjected to injection molding conditions, it is desirable that the modifying polymers blended into a polymer being injection molded be miscible in the first polymer; miscibility enhances the opportunity for avoiding weld-line strength difficulties and defects in finished, injection molded parts.

The prediction of miscibility between polymer pairs is still an art in infancy; miscibility is believed dependent upon a number of factors that include reactions between functional moieties pendant from one or more of the polymers, hydrogen bonding, and the like. Various suggestions have appeared for assisting in the selection of miscible polymer pairs including an application of Flory's equation of state as set forth by L. P. McMaster, 6 *Macromolecules*, 760 (1973).

Other suggestions for useful tools in assessing miscible polymer pairs have included: two-dimensional solubility parameters, inverse gas chromatography; crystallization characteristics of polymer blends; and evaluation of glass transition temperature shifts, as suggested by L. M. Robeson, 24 *Polymer Engineering and Science*, p.p. 589 (June 1984). That the prediction of miscible polymer pairs is still an art, rather than a science, is indicated by, for example, by chlorinated polyethylene having 42 weight percent chlorine being miscible in polyvinyl chloride, while chlorinated polyethylene havng a chlorine content less than 42% being immiscible in polyvinyl chloride as shown by Robeson, supra. at p.p. 588.

The prediction of properties of miscible blends is also uncertain. While some blend properties such as tensile strength may follow simple additivity rules, for example as noted for polycarbonate/polyester blends by Joseph, E. A., et al 23 *Polymer* p.p. 112 (1982), other blends may show synergistic enhancement of tensile properties as discussed by Olabisi, O., et al, 176 *Adv. Chem. Serv.*, p.p. 559 (1979). Blends characterized by the components being immiscible typically are found to exhibit a tensile strength minimum while blends having components characterized by slight miscibility and a dual glass transition temperature may exhibit both a tensile minimum and a maximum as discussed by Fried, J. R. et al, 50 *Journal of Applied Physics*, p.p. 6052 (1979).

There is some significant indication that polymer blends tend to exhibit partial miscibility, and that graphical depictions of such partial miscibility tend to be of the minimum solution temperature type, that is those solubility curves having a minimum critical solution temperature below which a polymer pair exists in miscible state and above which, two phases are present, one phase being rich in a first polymer and the second phase being rich in a second polymer; Robeson, supra. p.p. 588. One possible explanation for a lack of solubility between polymer pairs may, in some cases, be related to the minimum critical solution temperature being lower than a glass transition temperature for one or both of the polymers; the polymers being below a glass transition temperature; a melt state for one or both of the polymers being non existent.

A number of substances forming a miscible melt with polyvinyl chloride have been identified in the literature, Robeson, supra. at p.p. 588, however, chlorinated polyvinyl chloride appears to have received less attention. Polyvinyl chloride and chlorinated polyvinyl chloride being chemically different compounds and particularly where properties of a miscible blend of two polymers is in part dependent upon such factors as hydrogen bonding and pendant functional moieties, the simple fact that polyvinyl chloride forms a miscible pair with a second polymer is not a particularly good indicator that chlorinated polyvinyl chloride will also form a miscible pair with the second polymer.

While chlorinated polyvinyl chloride is possessed generally of performance characteristics and, particularly temperature performance characteristics, superior to polyvinyl chloride, enhanced performance characteristics associated with a blend of chlorinated polyvinyl chloride and a second polymer together in a miscible melt state could find substantial industrial utility.

DISCLOSURE OF THE INVENTION

The present invention provides a composition of matter comprising a miscible blend of chlorinated polyvinyl chloride having a chlorine content of between about 60% and 66% by weight and a polymethylmethacrylate (PMMA), the composition of matter having a PMMA content not greater than about 80% by weight. The composition of the instant invention is melt processable, is a substantially homogeneous substantially single phased material and demonstrates a glass transition temperature substantially in excess of that predicted by the so-called Fox equation, as described by Couchman, P. R., 11 *Macromolecules*, p.p. 1156, (1978).

The composition of the instant invention is substantially homogeneous notwithstanding heating to a temperature of at least 200° C. and typically, remains homogeneous to a temperature of not less than 230° C. The composition, upon being formed into a structure by melt processing techniques and subsequent cooling at a rate not less than 40° C. per minute, typically is substantially free of weld-line weaknesses.

Blending chlorinated polyvinyl chloride and PMMA in a proportion not exceeding 80% by weight PMMA at a temperature and under suitable pressure conditions whereby the chlorinated polyvinyl chloride and PMMA are substantially miscible, forms a single, substantially continuous phase. The resulting blended chlorinated polyvinyl chloride/PMMA possesses improved flow characteristics in the melt state, a substantially singular glass transition temperature, improved weld-lined fault properties, and enhanced heat distortion temperature.

The above and other features and advantages of the instant invention will become more apparent when considered in conjunction with a description of the preferred embodiment of the invention that follows, forming a part of this specification.

BEST EMBODIMENT OF THE INVENTION

Figure 1:
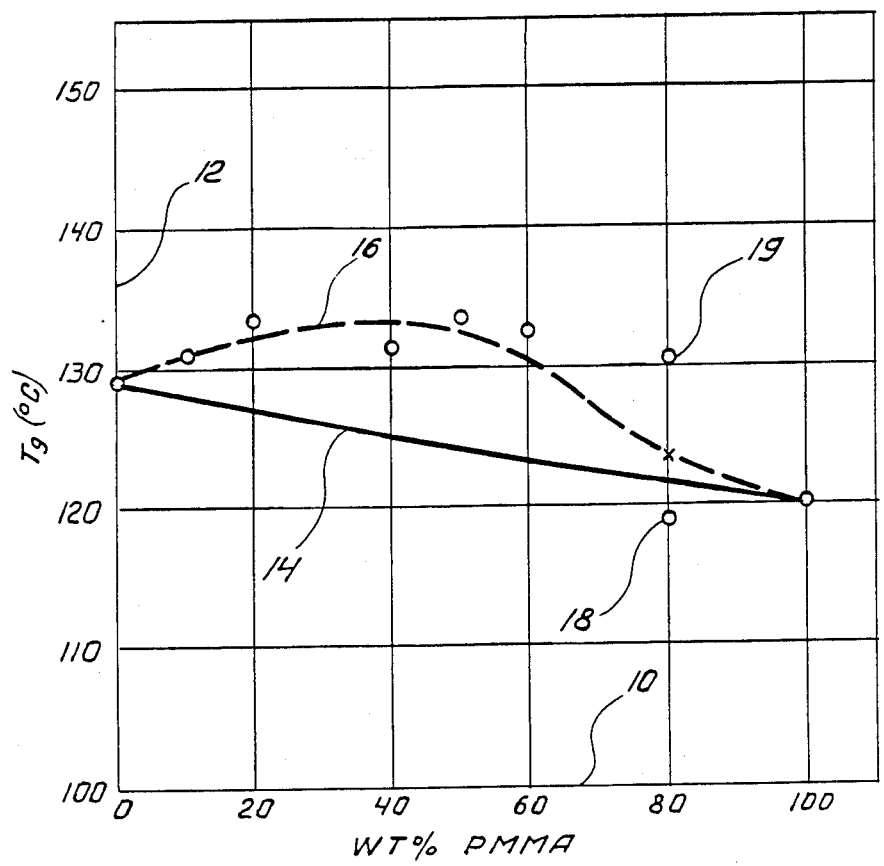
FIGS. 1 and 3 are graphical representations of glass transition temperatures for various blends of PVC or CPVC polymers with polymethylmethacrylate.

The present invention provides a composition of matter comprising a blend of chlorinated polyvinyl chloride and polymethylmethacrylate, the blended composition exhibits miscibility between the chlorinated polyvinyl chloride and polymethylmethacrylate polymers, and preferably is characterized by substantial miscibility between the blended polymers. For convenience, as used herein, the term CPVC shall be taken to mean chlorinated polyvinyl chloride, and the term PMMA shall be taken to mean polymethylmethacrylate.

CPVC is a widely commercially available polymeric material that can be prepared in commercially well known manner such as by suspension chlorination of polyvinyl chloride (PVC). More recently, techniques such as chlorination of PVC employing liquid chlorine, as set forth in U.S. Pat. No. 4,377,459, have become available, and the use of CPVC prepared in any suitable or conventional manner is contemplated as within the purview of this invention.

It has been found, that CPVC employed in the practice of the instant invention should be a PVC material chlorinated to include at least about 60% by weight chlorine and not more than about 66% by weight chlorine. A particular sample of CPVC is typically characterized by an average molecular weight and an inherent viscosity associated with a particular degree of PVC polymerization. CPVC is produced by the chlorination of PVC; PVC is the product of polymerizing vinyl chloride monomer and the chain length of any final PVC polymer molecule produced by the polymerization of vinyl chloride monomer may vary somewhat from molecule to molecule. Therefore, upon chlorination, the weight of individual molecules of chlorinated polyvinyl chloride may differ from molecule to molecule so that CPVC also may be characterized by an average molecular weight and an inherent viscosity. It has been found, however, that the degree of chlorination of the CPVC appears to be the controlling factor in determining solubility between CPVC and PMMA. Nonetheless, CPVC suitable for the practice of the instant invention possesses a weight average molecular weight of between about 73,000 and 140,000.

PMMA employed in the practice of the instant invention is available commercially and is a polymer formed by the polymerization of methylmethacrylate. The PMMA suitable for use in the practice of the instant invention should preferably not include more than about 10% by weight of other methacrylate monomers polymerized therein but may include up to about 10% by weight acrylonitrile. Appropriate methods for including other such monomers in the PMMA in appropriate proportion for producing a PMMA product having an non-methylmethacrylate monomer content of less than about 10% by weight are known to those skilled in the art of making PMMA.

Like CPVC, the weight of individual molecules of PMMA can vary from molecule to molecule, but in the practice of the instant invention it is preferable that the weight average molecular weight of PMMA copolymer be between about 27,000 and about 71,000.

The CPVC and the PMMA are blended together in suitable or conventional manner. For melt phase blending, preferably, blending is conducted above the glass transition temperatures for both the CPVC and the PMMA to facilitate mixing to form a blend possessing a single glass transition temperature. Alternately solvation of the polymers in a common solvent followed by coprecipitation from the common solvent is a much preferred method for forming molecularly well mixed blend.

By glass transition temperature, what is meant is the change in the amorphous region of a polymer from a hard and relatively brittle condition to a viscous or rubbery condition; usually brought about by changing the temperature.

In preferred embodiments, it is desirable that the CPVC and PMMA be at least partially miscible one in the other. A substantially single, homogeneous phase, characterizes a miscible state wherein the polymers, the PMMA and CPVC, essentially form a true solution. The glass transition temperature of the solution is greater by at least about 3° C. than the glass transition temperature for either pure CPVC or pure PMMA. The CPVC and PMMA are substantially miscible where the percentage of PMMA in the blend may vary from essentially zero to about 80% by weight. The actual percentage represented by one of the polymers in the blend in practice will be a percentage producing desirable performance characteristics in a final structure formed from the blended polymers. Such performance characteristics may include tensile strength, heat distortion temperature, corrosive resistance, and machineability among others.

Structures formed from the blended composition of the instant invention typically are formed by so called melt processing techniques such as melt spinning or injection molding from the composition in a melt phase. Structures produced from the composition of the instant invention display desirable tensile strength and weld-line strength, that is, for the latter, strength at joinder lines created particularly during an injection molding process or during heat welding of elements of structures formed from the melt phase composition. Good weld-line strength is typically a characterstic of substantially homogeneous thermoplastic materials and thermosetting resins and relatively infrequently characterizes blends of polymers that are immiscible or only partially miscible.

Blends of CPVC and PMMA can be formed by direct blending of melt state polymeric materials at a temperature above the glass transition temperature for either pure polymer. However, achievement of a homogeneous state is rendered difficult in such direct blending methods by the elevated viscosity demonstrated by resinous CPVC and PMMA materials above the glass transition temperatures for the individual polymers but below a thermal degradation temperature for the respective materials.

Accordingly, it is has been found advantageous to blend the CPVC and PMMA polymeric resins employing solution blending techniques. In a solution blending operation, the polymers to be blended are dissolved in a solvent in which the polymers are mutually quite soluble, generally at an elevated temperature. The solution of polymers is then introduced rapidly into a second solvent in which the first solvent containing the dissolved polymers is soluble but in which the polymers are not soluble. A closely intermixed polymeric precipitate results which can be recovered employing well-known techniques.

EXAMPLE I

A plurality of blends of CPVC and PMMA were prepared in accordance with Table I. The CPVC was possessed of a weight average molecular weight of between about 73,000 and about 140,000 while the PMMA was possessed of a weight average molecular weight of between about 27,000 and about 71,000. The CPVC and the PMMA were blended in weight amounts as shown in Table I. PVC admixtures with PMMA were included as controls.

The polymeric blends were prepared by first solution blending the CPVC or PVC and the PMMA; the CPVC or PVC (typically 0.25 grams) was added to PMMA (typically 0.25 grams) in jars containing 50 milliliters of 1,2-dichloroethane, the jars were capped, and were heated to 60° in an oven for approximately six hours or until the polymers dissolved, and then poured into a rapidly stirred beaker of approximately 300 milliliters of methanol. A fine powdery precipitate resulted which, after filtration, was dried overnight in vaccuo at 80° C. The resulting powdery precipitate was tested employing thermogravametric analysis to ascertain residual solvent evolved in the 150°–200° range. Typically, the powdery percipitate retained less than 0.3 weight percent solvent.

Further analysis employing a differential scanning calorimeter, a Perkin Elmer® DSC-2, was then performed. Any samples showing a more significant weight loss were further dried at 80° C. until the weight loss by thermogravametic analysis was less than 0.3. In differential scanning calorimetry analysis, the powdery precipitate sample was first heated to between 217° and 237° C. with a lower temperature being used for those precipitates which, by thermogravametric analysis indicated possible temperature instability. The particular temperature range was chosen to approximate a temperature range wherein compounds made employing such blends would be processed for structure forming techniques such as melt spinning and injection molding. Heating and cooling, within the limitations of the physical equipment, was constrained to 40° C. per minute.

After being once heated to at least about 217° C. and then cooled to ambient, the powdery precipitate sample was heated to the temperature selected and then quenched at 320° C. per minute.

Where the second temperature elevation of a prepared blend within the differential scanning calorimeter indicated a single, substantially narrow glass transition temperature range, and the prepared blend exhibited a single phase by transmission electron miscroscopy analysis at a 25,000× magnification, the sample was deemed to be a completely miscible (noted as M in the Tables) blend of the CPVC and PMMA. A sample was considered as substantially miscible (noted as SM in the Tables) where exhibiting a single glass transition temperature, but the presence of a minor second phase under transmission electron miscroscopy. A sample was considered partially miscible (noted as PM in the Tables) where a substantially broadened glass transition temperature was exhibited together with a significant second phase under examination by transmission electron miscroscopy. In those blends of partial miscibility, that is SM AND PM, the dispersed phase was diffuse in appearance indicating dissolution of both polymers in that dispersed phase.

Where a sample exhibited two distinct glass transition temperatures and where one, or both, of these glass transition temperatures were shifted at least 3° C. from a glass transition temperature associated with the pure components CPVC or PMMA polymers, the blends were categorized as substantially immiscible (noted as SI in the Tables). Where two glass transition temperatures were found in the powder by differential scanning calorimetry, and these glass transition temperatures were found to be approximately equal to those associated with the pure components, CPVC, PMMA, or PVC, the polymers were determined to be mutually immiscible (I). For slightly miscible or immiscible blends, transmission electron miscroscopy indicated distinct, well separated phases.

Where CPVC and PMMA were miscible (M), substantially miscible (SM), or partially miscible (PM), the glass transition temperature for the blend was elevated at least 3° C. beyond the value predicted by application of the so-called Fox equation expressed as $$\frac{1}{Tg} = \frac{W_1}{(Tg)_1} + \frac{W_2}{(Tg)_2}$$

where W=weight fraction and $(Tg)_i$ is in degrees Kelvin. Referring to FIG. 1, a graphical relationship is depicted between weight % PMMA plotted on an abcissa 10 and Temperature (°C.) plotted on an axis 12. A curve 14 depicts glass transition temperatures predicted by the Fox equation for blends of CPVC having 64.4% by weight chlorine and PMMA. A curve 16 depicts observed glass transition temperatures for the blends. The points 18, 19 represent 2 phase behavior of a blend following heating to 237° C. The curve 16 is plotted between the points 18, 19 and represents a Tg of a single phase formed when the blend was heated to only 207° C. and indicates a minimum solution temperature for this 80/20 composition of between 207° C. and 237° C.

It is preferable that a blend of CPVC and PMMA be entirely a single, homogeneous phase, that is, that the CPVC and the PMMA be completely miscible one in the other, in order to achieve optimal results in the performance of the polymers when fabricated into structures. However, satisfactory performance for a polymer blend has been obtained employing blends of CPVC and PMMA substantially miscible (SM) as set forth in Table I. Blends containing between about 60% and 66% by weight and particularly between about 61% and 65% chlorine can form single, homogeneous phases characterized by complete or substantially complete miscibility between the polymers. Contrarywise, the 50/50 blend of PVC/PMMA did not show a Tg substantially more elevated than that predicted by the Fox equation as set forth in Table I. Nothing in the behavior of PVC/PMMA blends suggests the enhancement of Tg available employing blends of CPVC and PMMA as set forth in this invention.

TABLE I

| Resin | Wt % Cl$_2$ | Tg(°C.)* Resin Component | PMMA$^\Delta$ Wt % | Tg(°C.) Blend Observed | Tg(°C.) Blend Predicted | Miscibility | Microscopy Phases |
|---|---|---|---|---|---|---|---|
| PVC | 56.5 | 91 | 50 | 107.5 | 105 | PM | 2 |
| CPVC# | 60.9 | 109 | 50 | 118.5 | 114 | SM | 2 |
| CPVC# | 64.4 | 129 | 10 | 130.5 | 128 | PM | — |
| CPVC | 64.4 | 129 | 20 | 133.5 | 127 | SM | — |
| CPVC | 64.4 | 129 | 40 | 131.5 | 125 | M | — |
| CPVC | 64.4 | 129 | 50 | 133.5 | 124 | M | 1 |
| CPVC | 64.4 | 129 | 60 | 132.5 | 123 | M | — |
| CPVC | 64.4 | 129 | 80 | 118.5/130.5 | 121.5 | SI | 2 |
| CPVC# | 67.1 | 146 | 50 | 120.5/144.5 | — | I | — |

*Tg = glass transition temperature
$^\Delta$Tg for PMMA = 120° C. ± 0.5° C.
Chlorinated in solution at 80° C. with PVC Geon ® 103EP (B. F. Goodrich)

EXAMPLE II

Table II depicts a miscibility-immiscibility relationship for CPVC or PVC blends with PMMA and methyl methacrylate/acrylonitrile (MMA/AN) copolymers as 50/50 composition blends by weight. Samples were prepared according to Example I and were heated to a maximum temperature of 237° C. for thermogravimetric analysis. CPVC used in this example was prepared by chlorinating in tetrachlorethane solution PVC (Geon ® 103EP). The blends of CPVC with PMMA//MMA/AN were prepared by coprecipitation from a 2% solution of the blend polymers in 1,2-dichloroethane employing an excess of methanol. After drying in a vacuum oven for 16 hours, the resulting precipitated powders were tested by thermogravimetric analysis for absence of residual solvent. If the samples showed more than a 0.2-0.3 percent weight loss in the 150°-200° C. range, additional drying was performed.

The results in Table II indicate that a 50/50 PVC/PMMA blend was partially miscible (PM), and this result is consistent with the reports of Walsh and McKeown as set forth in 21 *Polymer*, 1330 (1980), who found the pair to be miscible when heated to only 160° C. Unexpectedly, upon chlorinating PVC, miscibility actually improves. For example a 50/50 CPVC/PMMA composition is essentially completely miscible at a 64.4% CPVC chlorine level. Upon further chlorination, the CPVC/PMMA system tends towards immiscibility at 67.1% Cl. Clearly the properties of miscible or partially miscible PVC blends do not predict the behavior of blends with CPVC. The miscible behavior of CPVC is not universal, but depends strongly on the level of chlorine content as the results in Tables I and II show.

For blends of CPVC with MMA/AN copolymers, an acrylonitrile/methylmethacrylate (such as 9.5/90.5 wt/wt %) copolymer was fused on a 2-roll mill at 175° C. Separately, a CPVC (Geon ® 666×512, 63.5% Cl) containing 2% Dibutylin-S-S'-bis(isooctyl mercaptoacetate) stabilizer was fused at 170° C. Then a portion of the CPVC stock was banded at 170° C., followed by the addition of fused copolymer stock. The resulting blend of CPVC//AN/MMA (68/32 wt/wt %) was milled for two minutes before sheeting off. The glass transition temperatures of the three stocks were measured by differential scanning calorimetry (DSC) in the following way. A heating/cooling rate of 40° C./min was used. In the first heat scan the sample was heated to 117° C. to erase the thermal history and cooling stresses from milling. The Tg was determined on the second heat scan to 237° C. The results are summarized as:

| Sample | Tg (°C.) |
|---|---|
| Unblended AN/MMA | 110.9 ± 0.8 |
| Unblended CPVC | 107.1 ± 1.3 |
| AN/MMA//CPVC (32/68) | 115.3 ± 1.6 |

The unblended values represent the average of two measurements, and the value for the blend was based on three measurements. The 9.5/90.5 blend is characterized by a Tg at least 4° C. higher than that of either unblended component and higher than the 108° C. predicted for the 9.5/90.5 composition employing the Fox equation. One would therefore expect a higher heat distortion temperature (HDT) for the blend than that of either of the pure components. A transmission electron photomicrograph of the 9.5/90.5 blend of Table II revealed that the blend is partially miscible, consisting of a continuous CPVC/AN/MMA phase with a dispersed, diffuse, CPVC-rich phase.

The benefit of blending certain CPVC's with MMA polymers is illustrated further by comparing PMMA with styrene acrylonitrile copolymer (SAN) in blends with a CPVC containing 63.5% chlorine (Geon ® 686×512). Two PMMA's were used, one a medium

TABLE II

CPVC (OR PVC)//MMA/AN 50/50 BLENDS

| MMA/AN Wt % AN | DSV* | Tg (°C.) | Resin→ Wt % Cl Tg(°C.) | PVC 56.8 91 | CPVC 60.9 109 | CPVC 64.4 129 | CPVC 67.1 146 | CPVC 68.6 157 |
|---|---|---|---|---|---|---|---|---|
| 0 | —$^a$ | 120 | | PM | SM | M | I | I |
| 9.5 | 0.81 | 113.5 | | PM | M | PM | I | I |
| 15 | 0.90 | 106 | | PM | I | I | I | I |
| 29 | — | 99 | | SI | I | I | I | I |

*dilute solution viscosity, 0.2g/100cc tetrahydrofuran at 25° C.
$^a$Mw = 71,000, Mn = 30,800, Melt Index = 8 ASTM D 1238 Condition I.

molecular weight, the other a low molecular weight sample (Mw=27,100, Mn=13,300). The SAN was Dow Chemical Tyril® 03 (Mw=102,000, Mn=48,400) containing 31 wt % acrylonitrile. Formulations were fused on a 2-roll mill at 170° C., with stock temperatures reaching about 190° C. The resulting blends contained 20% by weight PMMA or SAN. The organotin stabilizer was added to a level of 2.0% of the amount of CPVC in the blend. Heat distortion test bars were molded at 182° C. The results are based on averages of three test bars and are plotted in FIG. 2, wherein an axis 40 plots Temperature as HDT and vertical bars 43, 44, 45, and 46 represent plus or minus two standard deviation units for heat distortion temperature determined experimentally for the Geon® 686×512, CPVC/SAN 80/20 blend, CPVC/PMMA (low Mw) 80/20 blend and CPVC/PMMA (med Mw) 80/20 blend respectively.

It is known among scientists and engineers who are knowledgable about the properties of polymers that the glass transition temperature (Tg) and the heat distortion temperature (HDT) of amorphous or substantially amorphous polymers are similar and change similarly with changes in structure, though numerically they are not the same because Tg is a heat capacity change under quiescent or static conditions, whereas HDT is a specific dimensional change under load. Thus, if an increase in Tg can be achieved by blending two miscible or substantially miscible polymers, it is reasonable to expect that a corresponding increase in HDT will also be observed.

Figure 2:
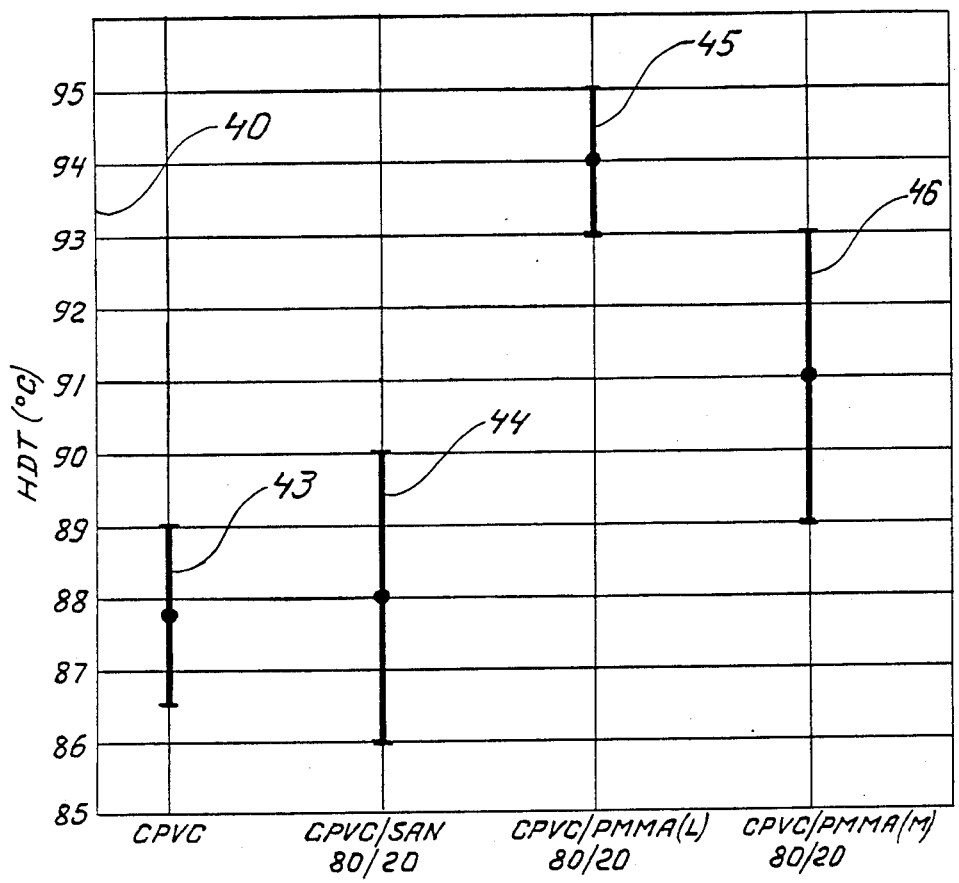
FIG. 2 is a graphical representation of heat distortion temperature ranges for various blends of PVC and CPVC polymers with other polymers.

In FIG. 2, the HDT results show that the CPVC/SAN 80/20 blend gave a HDT of 88° C., the same as the control CPVC. This blend by transmission election miscroscopy can be characterized as substantially immiscible. In contrast to these formulations, the blends with PMMA showed HDT enhancement. The blend employing medium Mw PMMA gave a 3° C. increase over the HDT of the pure CPVC, while the low Mw PMMA gave a 6° C. increase. According to the data in Table II, these CPVC blends would be expected to be substantially miscible (SM) to miscible (M).

EXAMPLE III

Figure 3:
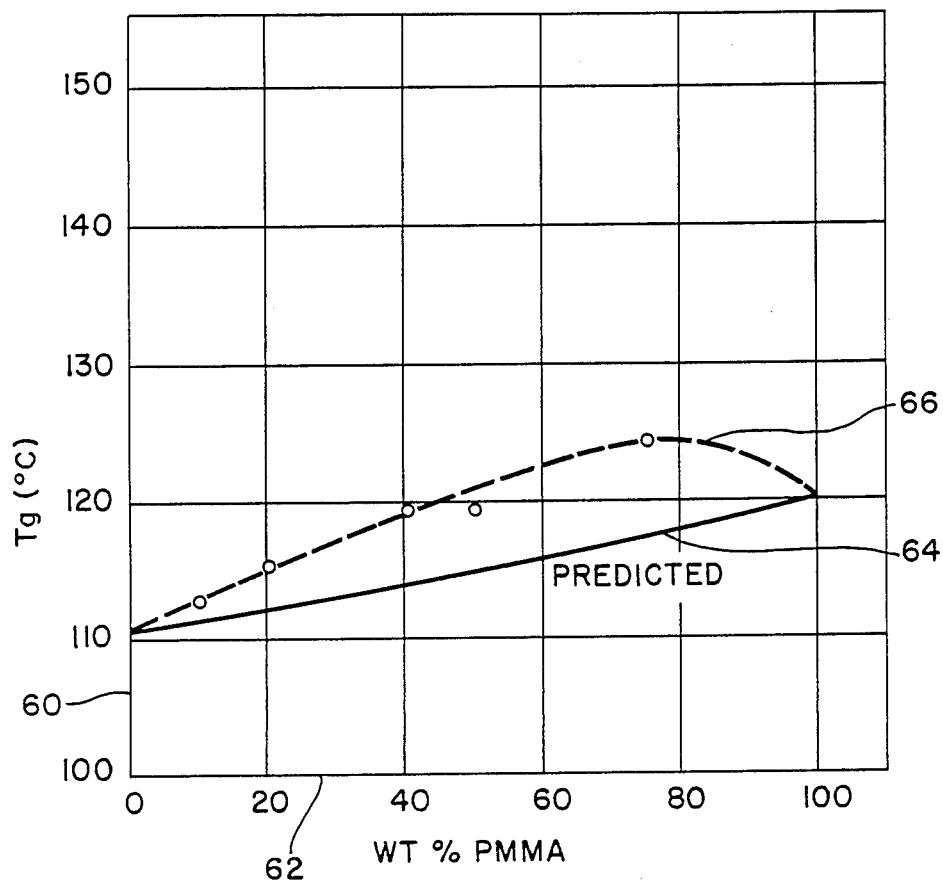

Generally miscible blends of Temprite® 666×512 CPVC (63.5% Cl by weight available from B.F. Goodrich) were formed with polymethylmethacrylate and glass transition temperatures were determined and are shown in FIG. 3 as curve 66 plotted against temperature in °C. on an axis 60 and wt % polymethylmethacrylate on an abcissa 62. The $t_g$ for such blends predicted by the Fox equation is shown as the curve 64.

Although it is not possible to predict miscible polymer pairs with certainty, solubility parameters are often used as predictors in effecting a preliminary determination. Mutual solubility is more likely where the solubility parameters for two polymers match as closely as possible. A method for calculating such parameters is described in the *Polymer Handbook*, J. Brandrup & E. H. Immergut, ed., John Wiley & Sons, New York, N.Y. 1975. This procedure can be applied to compare various CPVC's to PVC in predicting solubility with potentially miscible polymers, one can see further how the results in Table I were not predicted.

Table III lists properties including predicted solubility parameters for PVC and CPVC's up to 70% by weight chlorine. In Table III the DSC and nuculear magnetic resonance compositional data are interpolated from published data for solution chlorinated PVC's. The molar volume data are calculated from specific volume-weight percent chlorine data reported by Dannis and Ramp, *Encyclopedia of PVC*, L. I. Nass, ed., Vol. I, Marcel Dekker, Inc., New York, 1976 p.p. 240. Values for the solubility parameters of the CPVC's were calculated using Small's group constants as set forth in *Polymer Handbook*. From these constants and using a molar volume of 84.0 cc/mole for the PMMA monomer units, a calculated solubility parameter of 9.40 for PMMA resulted. Since the value calculated for PVC is 9.71, it follows that chlorination of PVC should result in less solubility with PMMA, and that solubility should decrease the greater the chlorine content in CPVC. However, these are not the observed results with 60–64% chlorine containing CPVC, which have calculated solubility parameters of abut 9.8–9.9, but which are more soluble with PMMA than PVC.

TABLE III

CALCULATED SOLUBILITY PARAMETERS OF PVC AND CPVC'S

| Resin | Cl (Wt %) | Tg (°C.) | CH$_2$ ← mole % | CHCl → | CCl$_2$ | Σ Fi (cal · cc)$^{\frac{1}{2}}$ / mole | Vm (cc/mol) | δ (cal/cc)$^{\frac{1}{2}}$ |
|---|---|---|---|---|---|---|---|---|
| PVC | 56.8 | 91 | 50 | 50 | — | 431 | 44.4 | 9.70 |
| CPVC | 61.0 | 110 | 42.8 | 55.7 | 1.5 | 459 | 46.7 | 9.83 |
| CPVC | 63.8 | 125 | 37.4 | 60.0 | 2.6 | 479 | 48.4 | 9.90 |
| CPVC | 66.9 | 145 | 30.0 | 64.5 | 5.5 | 511 | 50.8 | 10.07 |
| CPVC | 70.3 | 170 | 22.5 | 66.5 | 10.0 | 542 | 53.7 | 10.09 |

Fi = Molar attraction constant
Vm = Molar volume
δ = Solubility parameter

Particularly it may be seen that the glass transition temperature for CPVC may be favorably altered upwardly by the inclusion of significant quantities of PMMA. A higher glass transition temperature for a blend of CPVC and PMMA can provide for a wide variety of uses for structures having structural integrity at a more elevated temperature in contrast to substantially pure CPVC.

Where the CPVC and PMMA polymers are miscible (M), substantially miscible (SM), or even partially miscible (PM), the relative proportions of CPVC and PMMA in the blend is substantially irrelevant to the formation of the miscible phase unless exceeding about 80% by weight PMMA. Particularly for miscible (M) and substantially miscible (SM) blends, the CPVC and PMMA can be present in any proportion up to 80% PMMA and still provide desirable properties in finished structures attributable to the blending of CPVC and PMMA in accordance with the invention.

While a preferred embodiment of the invention has been shown and described in detail, it is apparent that various modifications may be made thereto without departing from the scope of the claims that follow.

What is claimed is:

1. A composition of matter consisting essentially of a blend of chlorinated polyvinyl chloride having a chlorine content not less than about 60% nor greater than about 66% by weight and polymethylmethacrylate, the polymethylmethacrylate comprising not more than 80% by weight of the blend, the blend being a substantially single phased composition possessed of a single glass transition temperature, the glass transition temperature of the blend being greater than a temperature predicted by application of the Fox equation.

2. The composition of claim 1, the chlorine content of the chlorinated polyvinyl chloride being not less than about 60.5% nor greater than about 65% by weight.

3. A method for improving melt processability and physical characteristics of chlorinated polyvinyl chloride comprising the steps of providing chlorinated polyvinyl chloride having a chlorine content of at least about 60% and not more than about 66% by weight; providing polymethylmethacrylate; and blending the chlorinated polyvinyl chloride and the polymethylmethacrylate to form a substantially single phased composition having not more than about 80% by weight polymethylmethacrylate and a glass transition temperature greater than a temperature predicted by application of the Fox equation.

4. The method of claim 3, the chlorinated polyvinyl chloride having at least about 61% and not more than about 65% by weight chlorine.

* * * * *